April 11, 1939.
C. E. HAINES
2,153,924
AERIAL ADVERTISING DEVICE
Filed May 31, 1932
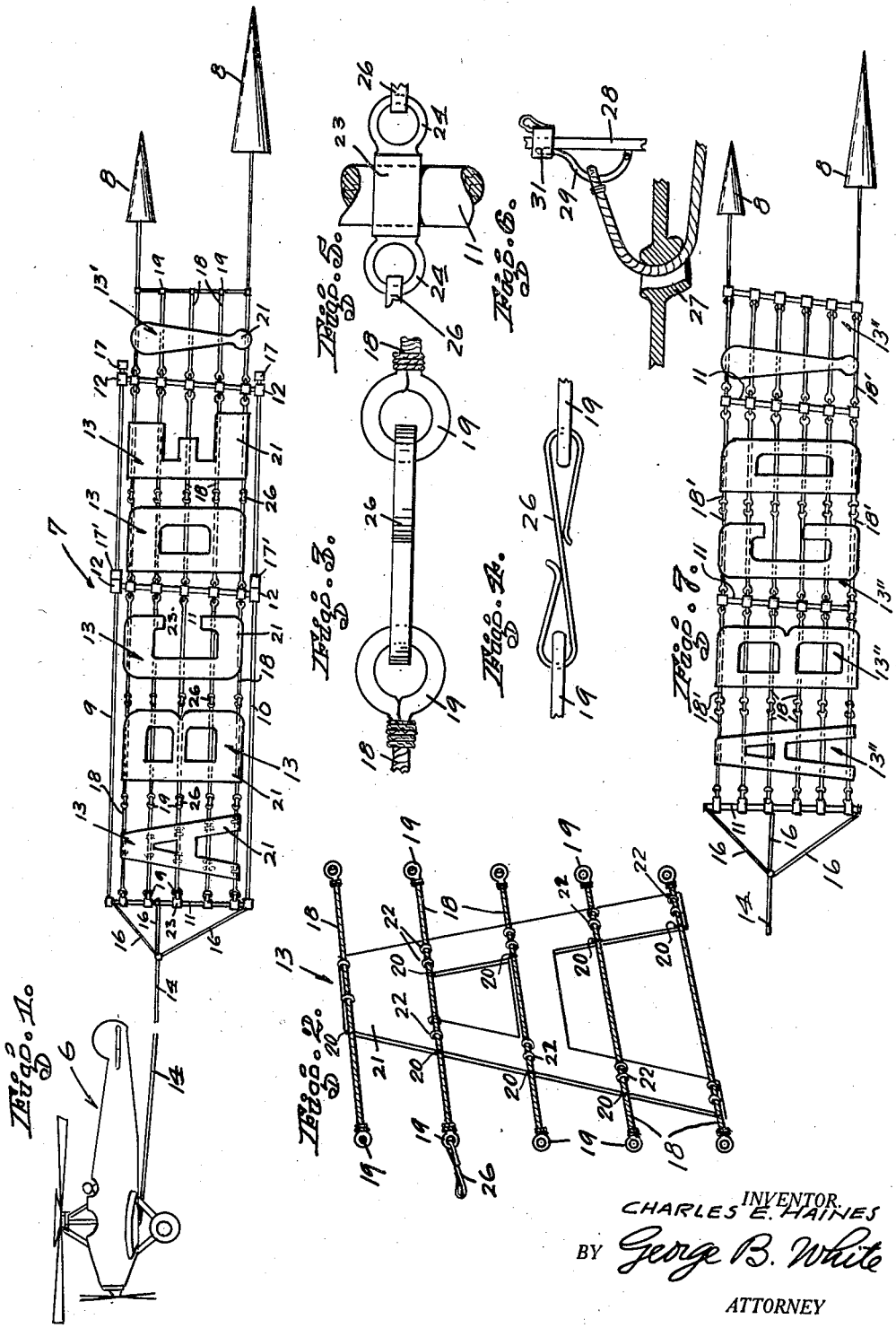
INVENTOR.
CHARLES E. HAINES
BY George B. White
ATTORNEY Patented Apr. 11, 1939

2,153,924

UNITED STATES PATENT OFFICE 2,153,924

AERIAL ADVERTISING DEVICE

Charles E. Haines, Santa Barbara, Calif., assignor to Pacific Giro Sales Co., Alameda, Calif., a corporation of California Application May 31, 1932, Serial No. 614,419

32 Claims. (Cl. 40—127)

This invention relates to aerial displays and advertisements.

The primary object of this invention is to provide an advertising device which can be readily payed out in the wake of an aircraft so that the letters or characters of the display are in the line of flight, but in a perpendicular plane relatively to the ground; means being provided to render individual sections or characters of the display readily detachable and interchangeable; the entire display is flexible and is so constructed as to allow the lifting of the display directly from the ground, trailing the rising aircraft.

While the display might be used in connection with various types of aircrafts, it is particularly adapted for use in connection with a so-called Autogiro.

Other objects and advantages are to provide an aerial display or advertisement that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein

Fig. 1 is a somewhat diagrammatic view of a display, constructed in accordance with my invention, and towed by an Autogiro.

Fig. 2 is a perspective rear view of a detachable unit of the display.

Fig. 3 is a detail side view of the connection between the foundation lines of adjacent units.

Fig. 4 is a plan view of the connection between the foundation lines.

Fig. 5 is a fragmental view of the connections to a strut.

Fig. 6 is a detail, sectional view of the releasable connection of the tow line to the aircraft, and Fig. 7 is a somewhat diagrammatic view of a modified construction of the display.

In its general organization my invention includes an aircraft, preferably an Autogiro 6, a flexible display 7, connected to the plane 6, and flexible, hollow cones 8, commonly known as air sox, for holding the display 7 under tension and in the line of flight of the airplane 6.

In detail the display 7 includes a pair of flexible parallel lines 9 and 10, connected to each other by stiffening members in the form of struts 11. The struts 11 are disposed at spaced longitudinal points on the lines, and extend across between said lines 9 and 10. A ferrule 12 is provided at each end of each strut 11. The lines 9 and 10 run through said ferrules 12.

The lines 9 and 10 and the struts 11, form a flexible frame into which detachable foundation sections 13 are secured. The forward end of the frame is connected to the airplane 6 by a tow line 14 and guy lines 16. The guy lines 16 are of different length, longer below the tow line 14 than above, so that the tow line is offset above the longitudinal center line of the display 7.

The strut 11 at the forward end of the frame is suitably fixed onto the respective ends of the lines 9 and 10. The other struts 11 are slidable on said lines 9 and 10. A stop 17 is fixed to the rear end of each line 9 and 10 to limit the rearward play of the rearmost strut 11. Similar stops 17' on the lines 9 and 10 limit the rearward play of the other struts 11.

It is to be noted that the upper line 9 is slightly longer than the bottom line 10 and the stops 17' and stop 17 are spaced farther from each other thereon than on the bottom or lower line 10 to allow slightly more looseness at the tops of the struts 11 than at the bottoms thereof. I have found in practice, that the loose side or edge of the sign always has a tendency to fly to the top, and this tendency is thus utilized to assist in holding the display in a substantially perpendicular plane.

Each foundation section or unit 13 is constructed of a plurality of parallel lines 18, each of which is provided with a loop 19 at each end thereof. On the spaced foundation lines 18 is attached a display character 21 such as a letter "A". Each forward or leading edge of the character 21 is stitched as at 20 or otherwise fixed to the respective foundation lines 18. The trailing portions of the character 21 have rings or loops 22 thereon to slidably engage the respective lines 18. In this manner allowance is made for slight rearward stretching of the material of the characters 21 as the sign is in flight.

The struts 11 have fixed collars 23 thereon, from which latter extend loops 24. The forward struts 11 are spaced apart far enough to accommodate a series of three foundation units 13 therebetween. In the other succeeding spaces between the intermediate struts 11, fit two units 13. The units 13 are connected to each other and to the struts 11 by clips 26. The clip 26 is a comparatively strong, resilient bar, bent to form hooks at its opposite ends in opposite directions, as shown, to slip over the loops 19 or 24 and firmly hold up under tension.

The leading or forward unit 13 is secured to the leading fixed strut 11; the next units 13 are hooked to each other endwisely; the third section is hooked to the second unit 13 at its forward end and to the second strut 11 at its rearward edge. The other units 13 are similarly hooked together by connecting said loops and clips, thereby to form a firm series of display units, which are readily detachable and interchangeable. The lines 18 on the foundation units 13 are equally spaced so as to be in extension of each other from one end of the sign to the other.

A rearmost foundation unit 13' extends rearwardly of the last strut 11. The free loops 19 of this unit 13' are connected to each other by a vertical line or wire. To the free end of the top and of the bottom lines 18 of the rearmost unit 13' is connected a hollow cone 8. The cones 8 are disposed in a vertical plane. The upper cone 8 is smaller and it is nearer to the rear end of the display than the lower cone 8. This further assists in stabilizing the aerial sign in a vertical plane in the line of flight.

In the modified embodiment of my invention shown in Fig. 6, I utilize foundation lines 18' made of metal, such as piano wire. In other respects the sectional units 13'' are secured into series as heretofore set forth. By the use of wire lines 18, the necessity for the lines 9 and 10 is obviated and the weight of the sign is materially reduced. The wire lines 18' near the bottom, are made slightly shorter than the upper lines 18'. The length of the wires 18' is increased gradually toward the top, thereby to provide the looseness at the top of the sign hereinbefore referred to.

The sign is connected to the Autogiro, by inserting the tow line 14 through a conduit 27, which latter extends through the floor of the craft. In the pilot compartment is a fixed bar 28 having a hinged holder 29 along one side thereof. The free end of the holder 29 is held by a suitable sleeve 31 slidable on the bar 28. The end of the tow line 14 has a loop on it which is engaged with the holder 29 and the latter is then held by the sleeve 31 on the bar 28.

In practice the sign is assembled and laid on the ground and its tow line 14 is connected to the Autogiro. When the Autogiro rises, it picks up the forward or leading end of the sign and lifts the display gradually into the air. Then the cones 8 rise into the line of flight, by reason of their aerodynamic resistance. Thus the display is held in horizontal position behind the aircraft. The display characters are held in a perpendicular plane, and are clearly visible from both sides from a long distance.

The advertisement or the like, can be thus held in the air as long as the aircraft is in flight. Before landing, the pilot of the aircraft releases the entire display by pulling the sleeve 31 off the end of the hinged holder 29, the latter is turned by the tension of the tow line 14, until the tow line 14 slips off the holder 29 and out through the conduit 27. At this time the hollow cones 8 act as suspension means, similarly to parachutes, and suspend the entire sign in the air, and lower the same slowly to the ground.

Having thus described this invention, what I claim and desire to secure by Letters Patent is:

1. In aerial advertising the combination with an aircraft, of a tow line extended rearwardly from the aircraft, a foundation frame for display comprising a pair of longitudinal lines, and struts between the longitudinal lines to space the latter apart, a series of display characters on the frame connected to the struts, means to connect the frame to the tow line, a hollow cone connected to top and bottom of the rearmost character of said series to receive the airstream in the wake of the plane and hold the series of characters and the longitudinal lines under tension and substantially in the line of flight, the upper line being longer and the cone at the bottom being larger to right the sign into vertical plane.

2. In aerial advertising the combination with an aircraft, of a tow line extended rearwardly from the aircraft, a foundation frame for display comprising a pair of longitudinal lines, and struts between the longitudinal lines to space the latter apart, means to connect the frame to the tow line, foundation sections formed of lines being detachably secured in series between the struts, display characters on each section, a hollow cone connected to each top and bottom of the rearmost section to receive the airstream in the wake of the plane and hold the longitudinal lines under tension and substantially in the line of flight, the upper longitudinal line being longer and the lower cone being larger to right the sign into vertical plane.

3. Means for advertising from aircraft comprising longitudinal lines, stiffening members therefor connected to and extending perpendicularly between said lines, a series of foundation sections detachably secured between said stiffening members and lines, each section having a display character thereon; means to connect an end of said lines to an aircraft, and means at the free end of the series of sections adapted to be actuated by the airstream to hold the series of foundation section lines in a perpendicular plane and extended in the line of flight.

4. Apparatus for aerial advertising, comprising an Autogiro, a tow line, a sign frame connected to the tow line, longitudinal lines on the frame, struts connecting said longitudinal lines to each other, a series of sign characters detachably secured to said frame, and being slidable on the lines, means to limit rearward sliding of said characters, and means connected to the series of characters to hold the sign taut in the line of flight, and to hold the lines under tension.

5. In an aerial display the combination with parallel lines, stiffening members to hold the lines apart, and means to hold the display under tension, of a flexible foundation web, a display character thereon, loops extended from the ends of the lines of said web, spaced loops extended from said stiffening members, and detachable clips engaged with the respective loops to hold the web in place.

6. In an aerial display the combination with longitudinal lines, stiffening members to hold the lines apart, and means to hold the display under tension, of a flexible foundation web, a display character thereon, loops extended from the ends of the lines of said web, spaced loops extended from said stiffening members, and detachable clips engaged with the respective loops to hold the web in place, said stiffening members being slidable on said lines, and stops on the lines rearwardly of said members to limit the play of said members and to limit the tension on the web.

7. In an aerial display of the character described a pair of longitudinal lines, means to connect the lines to an aircraft, a display between the lines, one line being longer than the other, an airstream blown direction cone on top and bottom of the end of the display, the bottom cone being larger than the other, to prevent the flapping and turning of the display.

8. In an aerial display of the character described, a pair of longitudinal lines, means to connect the lines to an aircraft, a display between the lines, one line being longer than the other, an airstream blown direction cone on top and bottom of the end of the display, the bottom cone being larger than the other, to prevent the flapping and turning of the display, said connecting means including elements to turn the sign into a vertical plane so that the longer line forms the top edge of the display.

9. In an aerial display the combination with longitudinal lines, stiffening members to hold the lines apart, and means to hold the display under tension, of a flexible foundation web, a display character thereon, loops extended from the ends of the lines of said web, spaced loops extended from said stiffening members; detachable clips engaged with the respective loops to hold the web in place, said stiffening members being slidable on said lines, stops on the lines rearwardly of said members to limit the play of said members and to limit the tension on the web, and lifting means connected to the web and adapted to be acted upon by airflow to hold the webs under tension.

10. In an aerial sign to be towed by an aircraft, a tow line, spaced lines longitudinal with respect to the sign being connected to the tow line, spaced stiffening members connecting the lines to each other, the spacing between the upper ends of the stiffening members being larger than between the lower ends of said members, a display element secured on said spaced lines and between said stiffening members.

11. In an aerial sign to be towed by an aircraft, a tow line, frame lines connected to the tow line to be payed out behind the aircraft, stiffening members connecting the frame lines to each other, said stiffening members diverging upwardly to hold the frame in a vertical plane, a display element secured on said spaced lines and between said stiffening members.

12. In an aerial sign to be towed by an aircraft, a plurality of sign sections, vertical elements between the adjacent sections to which the sections are connected to form a series, means to connect the series of sections to the aircraft, and means to cause the vertical elements to diverge upwardly as the sign is flown to hold the sign upright.

13. In an aerial sign to be towed by an aircraft, a sign foundation, means to connect an end of the foundation to the aircraft, a transverse spacing element at each end of the foundation, a display element on the foundation, and means to hold said transverse spacing elements in diverging position when the sign is flown.

14. In aerial advertising the combination with an aircraft, of a tow line extended rearwardly from the aircraft, a foundation frame for display comprising a pair of longitudinally extended lines, and struts between the lines, a series of display carrying elements on the frame connected to the struts, means to connect the frame to the tow line, the upper longitudinal line being longer than the lower, and the spacing between the upper end of the struts being longer than between the lower ends of the struts, to hold the frame in a substantially vertical plane.

15. In an aerial advertising apparatus, the combination with a foundation frame having a leading and trailing end, of advertising elements made of sheet material, means to fixedly hold the leading edges of the elements relatively to the foundation frame, the trailing edges of the elements being adapted to move rearwardly on said foundation when the elements are stretched in flight.

16. In an aerial advertising apparatus adapted to be flown by an aircraft, a series of sign sections detachably connected end to end, means at the leading end of the series to connect the same to the aircraft, and aerodynamic resistance means connected to the last section at the trailing end of the series, to hold the series under tension and in the line of flight of the airplane.

17. In an aerial advertising apparatus adapted to be flown by an aircraft, a series of sign sections detachably connected end to end, means at the leading end of the series to connect the same to the aircraft, aerodynamic resistance means connected to the last section at the trailing end of the series, to hold the series under tension and in the line of flight of the airplane; and means to hold the apparatus in a vertical plane.

18. In an aerial display, a flexible frame, means to connect the same to an aircraft, a display supporting structure secured at its leading end to said frame, the remaining portion of said supporting structure being slidably held on the frame member, and means to limit the sliding of said portion of the supporting structure toward the trailing end of the tow line.

19. In an aerial display, a flexible frame, means to connect the same to an aircraft, a display supporting structure secured at its leading end to said frame, the remaining portion of said supporting structure being slidably held on the frame member, means to limit the sliding of said portion of the supporting structure toward the trailing end of the tow line, and means to exert a pull on the display toward the trailing end of the frame member when the display is flown.

20. In an aerial display, a flexible frame member, means to connect the same to an aircraft, a display element slidably held on the frame member, and means to limit the sliding of the display toward the trailing end of the tow line, and a pair of wind blown cones connected to the display to support the trailing end of the display in position.

21. In an aerial display a plurality of display sections, means to detachably connect said sections to each other in series so as to form a flexible sign unit, means to connect the display to an aircraft, and a pair of wind blown substantially conical tubes connected to the display to support the trailing end of the display in position, each of said tubes being connected to the display independently of the other tube and being adapted to hold the display in a vertical plane in the line of flight.

22. In an aerial display, a tow line, means to connect the same to an aircraft, of a display support connected to the tow line a display element fixedly connected at its leading edges to the display support, and means to slidably connect the remaining portions of the display to the display support.

23. In an aerial display a plurality of foundation elements adapted to admit flow of air therethrough, stiffening members between said elements, means to secure said elements in series to each other and to the respective stiffening members, a display on each element, means to connect the leading end of the series of elements to an aircraft, and means at the trailing end to hold the elements taut in flight and to hold the trailing end suspended and retard the descent of the display when released in midair.

24. In an aerial display, the combination with towing means connected to an aircraft, including spaced frame members at an angle to the direction of towing; of a flexible foundation web between said members, a display character thereon, loops extended from the ends of the lines of said web, spaced loops extended from said members, and detachable connecting elements engaged with the respective loops to hold the web in place.

25. In an aerial display, spaced lines longitudinal relatively to the display, foundation elements arranged in series on said lines, display members on said elements, and a pair of coacting wind cones at the trailing end of the display adapted to hold the lines and the foundation elements taut both in flight and in descent.

26. In an aerial display, the combination with a sign extended from an aircraft on a tow line, of a pair of aerodynamic resistance members secured to and spaced behind the trailing end of the sign near the upper and lower edges of the sign, said resistance members being movable independently of each other, and means to connect the tow line to the leading end of the sign so that the end of the tow line adjacent the sign is between the lines of the upper and lower edges of the sign.

27. In an aerial display, the combination with a sign extended from an aircraft on a tow line, of a pair of aerodynamic resistance members secured to and spaced behind the trailing end of the sign near the upper and lower edges of the sign, and being capable of independent movement relatively to each other, and means to connect the tow line to the leading end of the sign so that the end of the tow line adjacent the sign is between the lines of the upper and lower edges of the sign but nearer to the line of the upper edge of the sign.

28. In an aerial display, the combination with a sign extended from an aircraft on a tow line, of a pair of aerodynamic resistance members secured to and spaced behind the trailing end of the sign, and being capable of independent movement relatively to each other, and connecting lines extended from the leading end of the sign to connect the tow line to the sign, said lines being arranged to hold the trailing end of the tow line above the longitudinal center line of the sign.

29. In an aerial display, the combination with a tow line and a sign extended from an aircraft, of a pair of separate aerodynamic resistance members, an element for each member to connect the same to the trailing end of the sign, so that said members exert a pulling force respectively on the upper and lower edges of the sign, said elements being adapted to hold the respective air resistance members in spaced relation behind the trailing end of the sign and to allow independent self adjustment of said resistance members.

30. In an aerial display a plurality of display units, adapted to admit flow of air therethrough, a plurality of stiffening members transverse to the display, means to secure said units in series to each other and to the respective stiffening members, a tow line and a plurality of lines interconnected between the tow line and the leading unit to hold the display in a position where said stiffening members are substantially vertical relatively to the ground.

31. In an aerial display, a foundation web, displays thereon, means on the leading end of the display to connect the display to an aircraft, a pair of wind cones at the trailing end of the web so arranged that each cone exerts a pull on one longitudinal edge of the web independently of the pull of the other cone at the other edge of the web, said connecting means including a tow line, and a plurality of forwardly converging connecting lines between the tow line and the leading end of the display, the juncture of said connecting lines with the tow line being below the the line of the upper edge of the web.

32. A banner consisting of a plurality of sections, each section comprising a series of parallel, spaced stringers arranged in a vertical plane; a character formed of flexible sheet material secured to each section, detachable couplings at the ends of the stringers, the banner being provided at interaals with transverse stiffening members, means for connecting the leading section to an air vehicle, and resistance means secured to the trailing section of the banner.

CHARLES E. HAINES.